United States Patent

[11] 3,582,187

[72] Inventor David R. Skillman
900 Quincy St. N.E., #2, Washington, D.C. 20017
[21] Appl. No. 831,015
[22] Filed June 6, 1969
[45] Patented June 1, 1971

[54] SYSTEM FOR THE TRANSMISSION OF ULTRAHIGH FREQUENCY ELECTROMAGNETIC WAVE ENERGY IN A FLOWING FLUID MEDIUM
15 Claims, 5 Drawing Figs.

[52] U.S. Cl. .................................................. 350/179, 250/199, 350/96
[51] Int. Cl. .................................................. G02b 3/12, G02b 5/14
[50] Field of Search .......................................... 350/175 Gnl, 179, 180, 96, WG

[56] References Cited
UNITED STATES PATENTS

| | | | |
|---|---|---|---|
| 3,400,993 | 9/1968 | Beck et al. | 350/179 |
| 3,410,627 | 11/1968 | Berreman et al. | 350/179 |
| 3,468,598 | 9/1969 | Ito | 350/45 |

Primary Examiner—John K. Corbin
Attorney—Diller, Brown, Ramik & Holt

ABSTRACT: The application describes a system for transmitting ultrahigh frequency wave energy utilizing a conduit having a fluid flowing therein in a direction opposite to the direction of one or more beams of energy. The energy beam or beams are provided by lasers, and are confined within the conduit. The conduit may be curved to conform substantially to the curvature of the earth. The fluid may flow in either a turbulent or laminar mode.

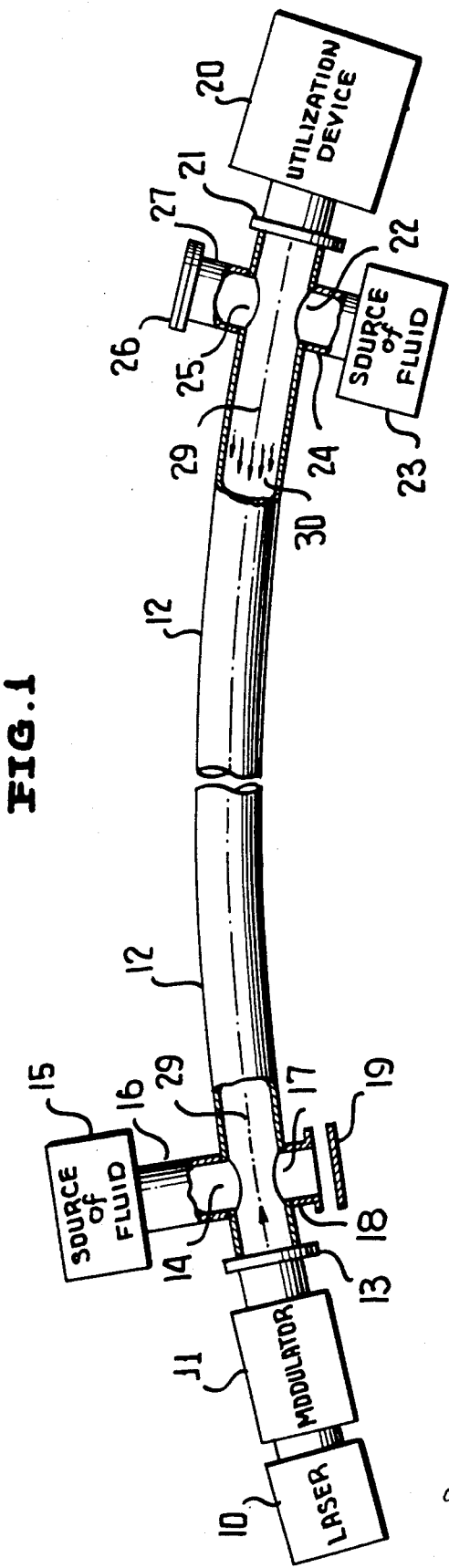
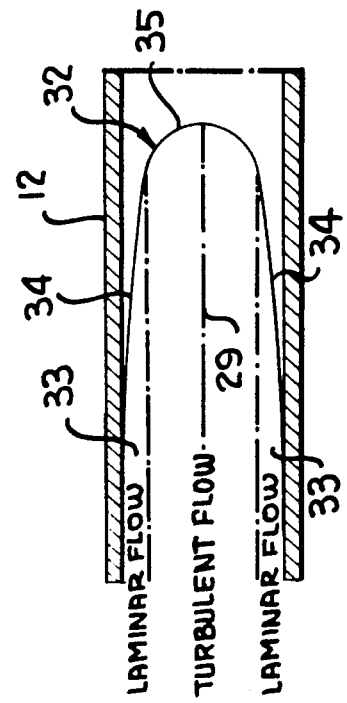
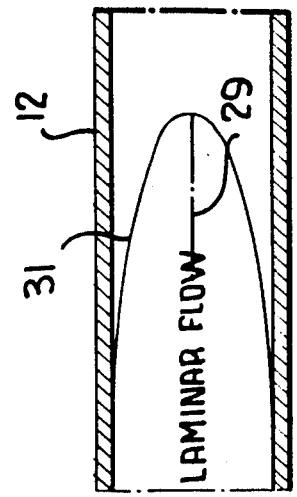
FIG. 1
FIG. 2a
FIG. 2b
INVENTOR
DAVID R. SKILLMAN
ATTORNEYS INVENTOR
DAVID R. SKILLMAN
Diller, Brown, Ramik & Holt
ATTORNEYS

SYSTEM FOR THE TRANSMISSION OF ULTRAHIGH FREQUENCY ELECTROMAGNETIC WAVE ENERGY IN A FLOWING FLUID MEDIUM

This invention relates to the transmission of energy beams. It more particularly relates to the transmission of ultrahigh frequency energy beams, including light and adjacent energy bands over considerable distances.

Numerous and varied devices have been invented and proposed for the generation and utilization of ultrahigh frequency energy beams, and for modulating such beams. Devices called lasers have been devised for generating narrow, intense, highly directive beams of substantially coherent, very high frequency electromagnetic wave energy between approximately 1,000 Angstroms and approximately 2 million Angstroms.

The development of devices for producing ultrahigh frequency energy beams, because of the extremely high frequencies of the waves, provided the possibility of transmission of intelligence such as speech, video signals, data transmission signals, multiplexed signals and the like over considerable distances.

Proposals have been made to transmit a substantially coherent light beam over great distances through conduits which may interconnect widely separate cites such as, for example, New York and Chicago. One such proposal is described in U.S. Pat. No. 3,400,993 wherein a transmission system is described in which a laminar flow of a first gas, and at least one additional gas having an index of refraction different than the first gas within a conduit in the same direction as a light beam is utilized as a transmission medium. In view of the laminar flow and the injection of the second gas from the periphery of the conduit, it is said that the gases tend to remain separate for an appreciable period thus inducing a radially varying index of refraction from the axis of the conduit to its periphery along portions of the conduit in which the gases have not been substantially mixed. Thus a focusing effect is obtained.

Another proposal for the transmission of a substantially coherent light beam over a considerate distance is described in U.S. Pat. No. 3,390,932 wherein a thermal diffusion gas lens employing gas mixtures within a conduit, is described. A heating means longitudinally distributed along the length of the conduit is provided to establish a thermal gradient normal to the direction of propogation.

The principal object of the invention is to provide a system for the transmission of energy beams utilizing a conduit having a fluid flowing therein in a direction opposite to the direction of the energy beams.

Another object of the invention is to provide a system for the transmission of energy beams utilizing a conduit having a substantially homogeneous fluid flowing therein.

A further object of the invention is to provide a system for the transmission of energy beams over curved paths of considerable length.

Yet another object of the invention is to provide a system for the transmission of a plurality of energy beams within a single conduit.

Yet a further object of the invention is to provide a system for the transmission of one or more energy beams through a conduit in either direction.

Still another object of the invention is to provide a system for the transmission of an energy beam wherein scattering or spreading of the beam may be substantially eliminated, and the beam constrained to a path.

Additional objects, the features and nature of the invention and advantages thereof will become apparent by reference to the following detailed description of illustrative embodiments, the appended claims and accompanying drawing, in which:

FIG. 1 illustrates diagrammatically an ultrahigh frequency beam transmission system employing a curved conduit for the transmission of a beam of substantially coherent ultrahigh frequency wave energy through a fluid medium flowing in a direction opposite to the direction of the beam;

FIG. 2a is a cross-sectional view of a portion of conduit, and illustrates the velocity profile therein for laminar flow of fluid;

FIG. 2b is a cross-sectional view of a portion of conduit, and illustrates the velocity profile therein for turbulent flow of fluid;

Figure 3:
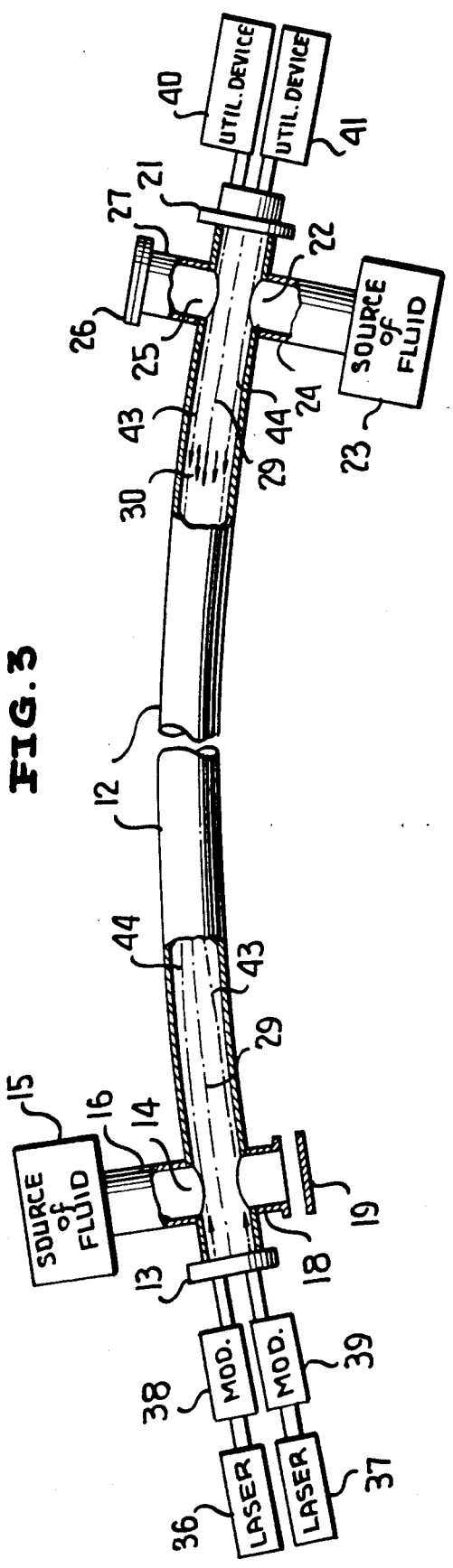
Figure 4:
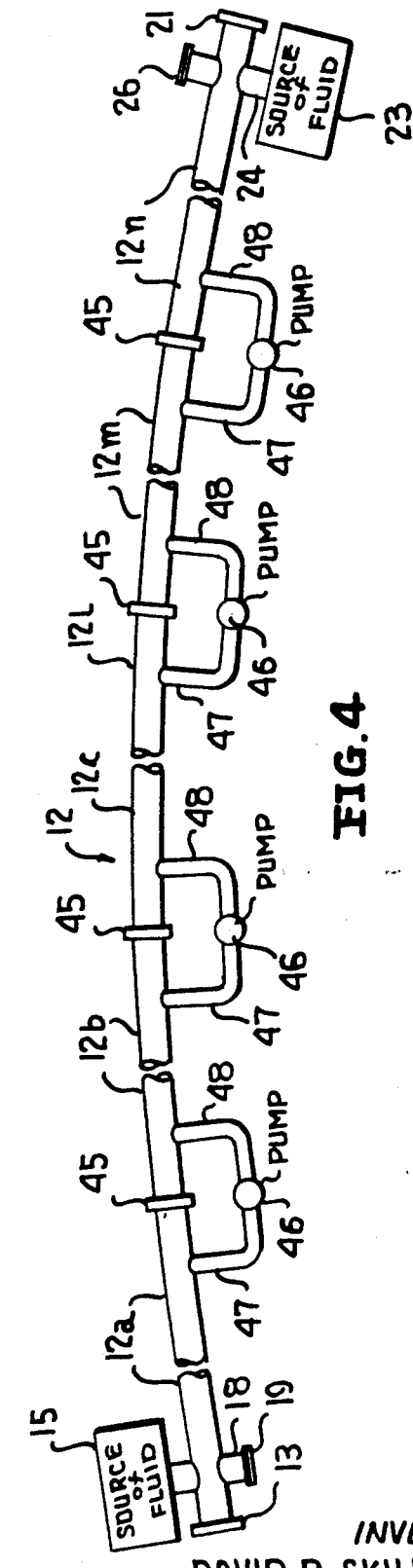

FIG. 3 illustrates diagrammatically an ultrahigh frequency beam transmission system employing a curved conduit for the transmission of a plurality of beams of substantially coherent wave energy through a fluid medium flowing in a direction opposite to the beams; and FIG. 4 illustrates diagrammatically an ultrahigh frequency beam transmission system employing a conduit having separate curved sections with pumps interconnecting the sections.

Referring to FIG. 1 in detail, there is shown an ultrahigh frequency beam transmission system including a laser 10 for producing a beam of substantially coherent ultrahigh frequency energy. The laser 10 may be coupled to a modulator 11 if it is desired to modulate the output thereof. The modulator 11 is coupled to a conduit 12 via a plate glass barrier 13 of high-grade optical glass. The conduit 12 may extend between points several hundreds of miles apart, as the break near the center of the FIG. is intended to illustrate. The conduit 12 is constructed of material impervious to liquids and gases and sufficiently good as a heat conductor that no sharp temperature gradients are established therein. Suitable materials are, for example, numerous plastics, copper, aluminum, steel and the like. The conduit 12 may be of square, oval, triangular, rectangular, or circular or other transverse cross-sectional shape. It is preferred that the conduit 12 be of small and substantially circular cross section and be opaque to the energy to be transmitted and adjacent frequency bands. The conduit 12 is illustrated as being curved. The curve is somewhat exaggerated for purposes of illustration and may realistically conform, for example, to the curvature of the earth.

The conduit 12 is provided with an opening 14 which provides coupling between the conduit 12 and a first source of fluid 15 via a pipe or extension 16. The fluid supplied by the fluid source 15 is substantially transparent to the energy beam to be transmitted and, of course, should be stable and chemically inert at any temperatures which are likely to be encountered. The fluid should be free of dust or opaque solid particles which could attenuate the beam. Suitable fluids include water, other liquids, clean air, nitrogen, inert gases and the like.

The first source of fluid 15 includes a pump, not illustrated, for providing sufficient force to sustain fluid flow in the conduit 12 and, if desired, filtering means for removing dust and opaque particles from the fluid.

The conduit 12 is provided with a second opening 17 which couples the conduit 12 to a pipe or extension 18. As shown, the extension 18 is open so that fluid flowing from right to left in the conduit 12 can be expelled. In the instance when air is utilized, of course, the pipe or extension 18 may open directly to the atmosphere. The pipe or extension 18 is provided with a cover member 19 or valve which may be closed whenever it is desired to reverse the flow of fluid within the conduit 12.

A utilization device 20 which may be, for example, a terminal in a communication system or a relay station, is coupled to the conduit 12 at the receiving end thereof via a plate glass barrier 21. Near the receiving end, the conduit 12 is provided with a third opening 22 which provides coupling between the conduit 12 and a second source of fluid 23 via a pipe or extension 24. The fluid supplied by the fluid source 23 has the same characteristics as the fluid supplied by the source 15 and, preferably should be of the same type. The source 23 also contains a pump, not illustrated, for providing force to sustain fluid flow in the conduit 12.

A fourth opening 25 is provided in the conduit 12 which couples the conduit 12 to a pipe or extension 27 which is provided with a removable cover member 26 or valve.

In accordance with the principles of the invention, the system illustrated in FIG. 1 is placed in operation by closing the pipe or extension 27 with the cover member 26 and opening the pipe or extension member 18 by removing the cover member 19. The fluid source 15 is placed in an inoperative condition, and the fluid source 23 activated. Fluid from the source 23 flows within the conduit 12 in the direction of arrows 30.

As is well known, the velocity of the flowing fluid is zero at the inner surface of a conduit while the velocity is maximum at the center of the conduit. When the flow is laminar, the velocity profile across the conduit 12 has a parabolic characteristic as shown by a curve 31 in FIG. 2a. When the flow is turbulent, the velocity profile across the conduit 12 has a somewhat different characteristic as shown by a curve 32 in FIG. 2b. At the inner surface of the conduit 12, the velocity is zero. Over a small distance inward from the inner surface a thin laminar region 33 exists which has a velocity profile of substantially parabolic nature as illustrated by parts 34 of the curve 32. The central portion of the velocity profile has a somewhat blunt characteristic as shown by portion 35 of the curve 32.

Once fluid flow has been established from the source 23 to the open pipe or extension 18, outflow may be connected to a suitable disposal area or, in the case of air, nitrogen, carbon dioxide and the like discharged directly into the atmosphere. Alternatively, the outflow may be recovered, reconditioned if necessary, and reused. One particular arrangement would be to use the outflow in a companion transmission system in which the direction of the beam and fluid flow were reversed.

Once the fluid flow of sufficient velocity has been established in the conduit 12, the laser 10 and the modulator 11 are activated. A beam of coherent ultrahigh frequency energy enters the conduit 12 via the plate glass barrier 13. In the conduit 12, the beam or portions thereof removed from axis 29 tends to be bent inwardly toward an axis 29 along which the fluid is flowing with maximum velocity. As a result, the beam tends to be focused along the axis 29 and tends to be bent toward the axis 29. Thus, undesirable spreading of the energy beam is substantially avoided and the beam confined within the curved conduit 12 so long as sufficient velocity of fluid flow is maintained therein.

The ultrahigh frequency energy beam so transmitted exits from the conduit 12 through the plate glass barrier 21 and is received by the utilization device 20.

In the event it is desired to transmit an ultrahigh frequency energy beam in reverse direction within the conduit 12, the direction of the fluid flow is reversed. This is accomplished by closing the pipe or extension 18 with the cover 19, opening the pipe or extension 27 by removing the cover 26, deactivating the fluid source 23 and activating the fluid source 15. A suitable utilization device, not shown, would be placed in communication with the conduit 12 via the plate glass barrier 13 and a source of beam of ultrahigh frequency energy placed in communication with the conduit 12 via the plate glass barrier 21.

Referring to FIG. 3 in detail, a second illustrative embodiment of an ultrahigh frequency beam communication system utilizing the principles of the invention is shown in which reference numerals as used in FIG. 1 denote similar parts.

A first source of ultrahigh frequency wave energy, a laser 36, and a second source of ultrahigh frequency wave energy, a laser 37, are provided. If desired, the outputs from the lasers 36 and 37 may be coupled to respective modulators 38 and 39 which, in turn, are coupled to a conduit 12 via a plate glass barrier 13. Alternatively, if it is not desired to modulate the outputs from the lasers 36 and 37, the outputs may be directly coupled into the conduit 12 via the plate glass barrier 13. At the receiving end of the conduit 12, a first utilization device 40 and a second utilization device 41 are coupled to the conduit 12 via a plate glass barrier 21.

The ultrahigh frequency beam transmission system is placed in operation, so far as fluid flow is concerned, in the same fashion as the system illustrated in FIG. 1. Once fluid flow of sufficient velocity and correct direction has been established in the conduit 12, the lasers 36 and 37, and the modulators 38 and 39 are activated. A discrete beam of coherent ultrahigh frequency enters the conduit 12 via the plate glass barrier 13 from each modulator. The two discrete beams enter the conduit 12 at points displaced from the axis 29 of the conduit as illustrated by paths 43 and 44. The displacement of insert paths 43 and 44 from the axis 29 may differ in radial or axial direction or magnitude or combinations thereof near the points of entry of the beams. While only two separate beams, beam paths and laser sources are illustrated in FIG. 3, it is to be understood that more than two beams, more than two paths and more than two laser sources may be provided.

Because of the differences in displacement of the beams traveling along the paths 43 and 44 from the axis 29 of the conduit 12, the tendency of each of the discrete ultrahigh energy beams to bend inwardly toward the axis 29 differs, and beams traveling along the paths 43 and 44 remain discrete within the conduit 12 over considerable distances. The separate beams are passed out of the conduit 12 via the plate glass barrier 21 and are delivered to separate utilization devices 40 and 41.

The tendency of beams of ultrahigh frequency energy to be bent toward the axis 29 is a function of the rate of change of the velocity profile of the fluid within the conduit 12. It can be seen, therefore, from FIG. 2b that when turbulent flow is established within the curved conduit 12, a greater bending per unit of radial measurement will take place in the region of the laminar flow 33 than in the central region of the conduit 12 wherein purely turbulent flow takes place. In such circumstances, a plurality of beams of ultrahigh frequency energy may be introduced into the curved conduit 12 near the inner surface thereof within the region of laminar flow, and each beam bent inwardly toward the interface between the laminar flow region 33 illustrated in FIG. 2b and the purely turbulent flow region in the center of the conduit 12 an amount sufficient to maintain the beams within the curved conduit 12. The tendency of the plurality of discrete beams to bend further towards the axis 29, however, is insufficient because the rate of change of the velocity profile within the purely turbulent region is insufficient. The beams consequently cross the axis 29 in a substantially straight path and enter the laminar flow region 33 only to again be bent toward the interface between the laminar and purely turbulent flow regions. The beams may cross the axis 29 of the curved conduit 12 several times during transmission. Thus, a plurality of ultrahigh frequency energy beams may be readily simultaneously transmitted over considerable distances through a curved conduit having a fluid flowing therein in a turbulent mode without the beams becoming indistinct.

It is to be understood, in the case of purely laminar flow within the curved conduit 12, that a plurality of beams also may be simultaneously transmitted for near the axis 29 within the conduit 12 the rate of change of the velocity gradient approaches zero.

Referring to FIG. 4 in detail, a further illustrative embodiment of an ultrahigh frequency beam communication system is shown in which reference numerals as used in FIG. 1 denote similar parts. A curved conduit 12 is arranged between plate glass barriers 13 and 21 as in the embodiment illustrated in FIG. 1. The conduit 12 is divided into a plurality of similar sections 12a, 12b, 12c... 12l, 12m and 12n. While six sections are shown, it is understood that as many sections as desired may be used, the sections are suitably mechanically connected together and are optically coupled by plate glass barriers 45. Each section of the conduit 12 is interconnected to an adjacent section or sections by a fluid pumping arrangement comprising a pump 46 and pipes 47 and 48. The pumps 46 are preferably reversible so that fluid may be pumped in either direction in the conduit 12.

In placing the present invention, using fluid flow, into operation and in designing systems utilizing the principles of the present invention, it is well to consider the mathematical relationships of the various parameters.

It is known that the velocity of light in a moving medium is given by the expression $$u = \frac{c}{n} \pm v\left(1 - \frac{1}{n^2}\right) \quad (1)$$

where
c × the speed of light,
n × the index of refraction of the medium, and
v × the velocity of the medium.

If the medium has different velocities at different points, as is the case with a fluid medium flowing within a conduit in a direction opposite to light, let $v_1$ be the velocity at a point and $v_2$ be the velocity at a nearby point, then using formula (1) the velocity of light at the two points may be given by the expressions $$u_1 = \frac{c}{n} - v_1\left(1 - \frac{1}{n^2}\right) \text{ and} \quad (2)$$

$$u_2 = \frac{c}{n} - v_2\left(1 - \frac{1}{n^2}\right) \quad (3)$$

where
$u_1$ is the velocity of light at a point, and
$u_2$ is the velocity of light at a nearby point.

If we are concerned with differential flow in a curved conduit, $$v_2 = v_1 + \Delta v = v_1 + \frac{dv}{dr}dr \quad (4)$$

where $\frac{dv}{dr}$ is the first derivative of the velocity profile within the conduit and $dr$ the distance between a point within the conduit and a second point within the conduit radially displaced therefrom. In order to retain light within the conduit, a relationship must hold which can be stated in the expression $$\frac{r_1}{r_2} = \frac{u_1}{u_2} \quad (5)$$

where
$r_1$ is the radial distance to the center of curvature of a first point within the curved conduit, and
$r_2$ is the radial distance to the center of curvature of a second point within the conduit radially spaced from the first point.

Thus, the expression can be also stated as $$\frac{r_1}{r_1 + dr} = \frac{u_1}{u_2}.$$

By substituting, one can obtain the expression $$\frac{r_1}{r_1 + dr} = \frac{\frac{c}{n} - v_1\left(1 - \frac{1}{n^2}\right)}{\frac{c}{n} - \left(v_1 + \frac{dv}{dr}dr\right)\left(1 - \frac{1}{n^2}\right)}$$

which, to the first approximation, can be expressed as $$\cong \left[1 - \frac{nv_1}{c}\left(1 - \frac{1}{n^2}\right)\right]\left[1 + \frac{n}{c}\left(v_1 + \frac{dv}{dr}dr\right)\left(1 - \frac{1}{n^2}\right)\right]$$

and $$\cong 1 + \frac{n}{c}\left(v_1 + \frac{dv}{dr}dr\right)\left(1 - \frac{1}{n^2}\right) - \frac{nv_1}{c}\left(1 - \frac{1}{n^2}\right) +$$

terms in $\frac{v^2}{c^2}$ neglecting the terms in $\frac{v^3}{c^3}$, the expressions become $$\cong 1 + \left(\frac{n}{c}\right)\left(\frac{dv}{dr}dr\right)\left(1 - \frac{1}{n^2}\right)$$

therefore, $$1 - \frac{dr}{r} \cong 1 + \left(\frac{dr}{c}\right)\left(\frac{dv}{dr}\right)\left(n - \frac{1}{n}\right) \quad r\frac{dv}{dr} \cong \frac{c}{\left(n - \frac{1}{n}\right)} \quad (6)$$

It can be seen from formula (6) in order to constrain light within a uniformly curved conduit, it is necessary that the fluid velocity profile be such that at some point within the conduit the radial distance from the center of the curvature times the first derivative of a point on the velocity profile at least equal a constant expressed in terms of the speed of light and index of refraction of the fluid as indicated.

If the conduit 12 is somewhat irregularly curved in a practical case, the conduit should be considered to exhibit an effective radius of curvature which is the least for purposes of applying the design considerations expressed in formulas (1)—(6). In the event a beam or beams of light which are coupled into a conduit are either intentionally or unintentionally coupled with their axis or axes somewhat askew the axis of the conduit, the effective radius of curvature may be less than the case in which the axis of a beam exactly coincides with the axis of the conduit 12. In such a case, the system should be considered to exhibit an effective radius of curvature which is the least in utilizing the design considerations expressed in formulas (1)—(6).

It will be appreciated, for each given radius of curvature and conduit width, that the velocity required to provide a velocity profile within the conduit having a first derivative sufficiently great at a point on the velocity profile to provide for sufficient bending of the energy beam can be empirically determined.

The fluid velocity gradient which exists within the conduit during operation of the present invention provides a transmission gradient transverse to the path of an energy beam within a conduit. The term transmission gradient, as used herein, means a gradient within a transmission medium which causes wave energy to travel at differing velocities at varying distances from the axis of a path so that the wave energy is bent toward the axis.

Although the illustrated embodiments relate to the transmission of ultrahigh frequency electromagnetic waves, it is to be understood that the invention contemplates transmission of other types of waves through fluids as well.

While in each of the illustrated embodiments, only one conduit is shown, it is to be understood that a plurality of similar conduits can be placed in parallel with one another and arranged to be fed by the same fluid-pumping system. In such an embodiment a separate velocity gradient would exist within each conduit.

Numerous and varied modifications of the described illustrative embodiments can be made without departing from the principles of the invention. It is accordingly to be understood that the specific foregoing description and structure described are illustrative, and are not restrictive of the scope of the invention defined in the appended claims.

I claim:

1. A system for the transmission of energy beams comprising a curved conduit, means for establishing a fluid flow in a given direction in said curved conduit for establishing a velocity gradient transverse to the axis of said curved conduit and means for establishing at least one energy beam in said curved conduit directed in a direction opposite to the direction of fluid flow, the velocity of said fluid being maximum in the region of said axis thereby establishing a radially outwardly decreasing effective index of refraction within said curved conduit, whereby a substantial guiding of said energy beam is obtained solely from the index of refraction gradient established within the conduit by said velocity gradient.

2. A system according to claim 1, wherein said energy beam is an energy beam substantially centered about the axis of said conduit.

3. A system according to claim 1, wherein said means for establishing at least one energy beam comprises at least one laser for generating an ultrahigh frequency electromagnetic wave energy beam coupled to a first end of said conduit.

4. A system according to claim 3, wherein said at least one laser is coupled to said conduit via a modulator.

5. A system according to claim 1, wherein the means for establishing at least one energy beam comprise means for establishing a plurality of beams within said conduit, each of said beams having relatively different radial and/or angular displacement from the geometric axis of said conduit.

6. A system according to claim 5, wherein said means for establishing a plurality of energy beam comprise a plurality of lasers for generating a plurality of ultrahigh frequency electromagnetic wave energy beams coupled to a first end of said conduit.

7. A system according to claim 6, wherein each laser is coupled to said conduit via one of respective modulators.

8. A system according to claim 5, wherein said means for establishing fluid flow comprise means for establishing laminar fluid flow.

9. A system according to claim 5, wherein said means for establishing fluid flow comprise means for establishing turbulent fluid flow, the velocity of the fluid being maximum in the region of said axis and a laminar flow region being present adjacent the inner surface of said conduit.

10. A system according to claim 1, wherein said means for establishing fluid flow comprise means for establishing laminar fluid flow.

11. A system according to claim 1, wherein said means for establishing fluid flow comprise means for establishing turbulent fluid flow, the velocity of the fluid being maximum in the region of said axis and a laminar flow region being present adjacent the inner surface of said conduit.

12. A system for the transmission of energy beams comprising a conduit, means for establishing a fluid flow in a given direction in said conduit for establishing a velocity gradient transverse to the axis of said conduit and means for establishing at least one energy beam in said conduit directed in a direction opposite to the direction of fluid flow, the velocity of said fluid being maximum in the region of said axis thereby establishing a radially outwardly decreasing effective index of refraction within said conduit, whereby a substantial guiding of said energy beam is obtained solely from the index of refraction gradient established within the conduit by said velocity gradient.

13. A system according to claim 12, wherein the means for establishing at least one energy beam comprise means for establishing a plurality of beams within said conduit, each of said beams having relatively different radial and/or angular displacement from the geometric axis of said conduit.

14. A system according to claim 12, wherein said means for establishing fluid flow comprise means for establishing laminar fluid flow.

15. A system according to claim 12, wherein said means for establishing fluid flow comprise means for establishing turbulent fluid flow, the velocity of the fluid being maximum in the region of said axis and a laminar flow region being present adjacent the inner surface of said conduit.